(12) United States Patent
Siemens

(10) Patent No.: US 6,738,620 B2
(45) Date of Patent: May 18, 2004

(54) CORDLESS PHONE SYSTEM CAPABLE OF SUPPORTING A BROADCAST OVER BROADCAST MODE

(75) Inventor: Gerhard Siemens, Round Rock, TX (US)

(73) Assignee: Siemens Information & Communication Mobile, LLC., San Diego, CA (US)

(*) Notice: Subject to any disclaimer, the term of this patent is extended or adjusted under 35 U.S.C. 154(b) by 538 days.

(21) Appl. No.: 09/730,624

(22) Filed: Dec. 5, 2000

(65) Prior Publication Data

US 2002/0068561 A1 Jun. 6, 2002

(51) Int. Cl.⁷ ................................................ H04Q 7/20
(52) U.S. Cl. ........................ 455/426.1; 455/552.1; 455/556.1; 379/159
(58) Field of Search ............................ 455/3.01, 3.02, 455/3.03, 3.04, 426.1, 426.2, 462, 465, 507, 517, 556, 418, 419, 420, 466, 550.1, 552.1, 554.1, 554.2, 555, 556.1; 379/156, 157, 159

(56) References Cited

U.S. PATENT DOCUMENTS 5,541,980 A * 7/1996 Urewicz .................. 455/404.1
5,995,844 A * 11/1999 Fukuda ....................... 455/462

(List continued on next page.)

FOREIGN PATENT DOCUMENTS

| EP | 0984640 A2 | 8/2000 |
| JP | 05 48684 A | 2/1993 |
| WO | WO 97/39562 | 10/1997 |
| WO | WO 97/44910 | 11/1997 |
| WO | WO 01/17288 | 3/2001 |

OTHER PUBLICATIONS

European Telecommunication Standard, "Radio Equipment and Systems (RES); Digital European Cordless Telecommunications (DECT) Common Interface, Part 2: Physical Layer", ETS 300 175–2, Oct. 1992.

European Telecommunication Standard, "Radio Equipment and Systems (RES); Digital European Cordless Telecommunications Common Interface", ETS 300 175–3, Oct. 1992.

Primary Examiner—Edward F. Urban
Assistant Examiner—Simon Nguyen

(57) ABSTRACT

A cordless digital telephone system which allows broadcast over broadcast is provided. Time division multiple access (TDMA) cordless phone systems provide a base unit which is able to provide connections for a plurality of mobile units, such as handsets. With time division, the mobile units are synchronized to different time slots. A broadcast mode is provided that causes the mobile units to be placed in a receive only mode and to synchronize to the same time slot where a broadcast message is sent. In this way, a cordless telephone base unit in a broadcast mode receives a radio or streaming audio signal. A call controller unit included in or coupled to the base station then sends the received radio or streaming audio signal to at least one mobile unit in communication with the base station. In those cases where a mobile unit is receiving the broadcast and a conventional phone call is received at the base station, then a determination is made whether or not to send the conventional call to the mobile unit is made. In those cases where the conventional call is to be forwarded, then the base station is set to standard mode and the conventional call is forwarded to the mobile unit whereas any other mobile unit in communication with the base station still receive the broadcast.

17 Claims, 6 Drawing Sheets

U.S. PATENT DOCUMENTS

| | | | | |
|---|---|---|---|---|
| 6,029,071 A | * | 2/2000 | Bertocci et al. | 455/463 |
| 6,078,574 A | | 6/2000 | Boetzel et al. | 370/337 |
| 6,088,338 A | | 7/2000 | Rossella et al. | 370/294 |
| 6,091,961 A | * | 7/2000 | Khalil | 455/466 |
| 6,128,504 A | * | 10/2000 | Ciccone | 455/464 |
| 6,138,027 A | * | 10/2000 | Huang | 455/462 |
| 6,157,815 A | * | 12/2000 | Collins et al. | 340/7.32 |
| 6,449,480 B1 | * | 9/2002 | Brownlee et al. | 455/435.1 |
| 6,477,382 B1 | * | 11/2002 | Mansfield et al. | 455/458 |

* cited by examiner

CORDLESS PHONE SYSTEM CAPABLE OF SUPPORTING A BROADCAST OVER BROADCAST MODE

BACKGROUND OF THE INVENTION

1. Field of the Invention

The present invention relates to personal telephone systems that are able to transmit and receive digital signals between fixed sets and fixed stations in a cordless system. More particularly, the present invention relates to providing the capability of providing a broadcast over broadcast mode in a cordless telephone system.

2. Description of the Related Art

Time division multiple access (TDMA) cordless phone systems provide a base unit which is able to provide connections for a plurality of mobile units, such as handsets. Such TDMA systems use time division to provide a plurality of slots, where the base (fixed part (FP)) transmits to an individual (portable unit (PP)) mobile unit during a particular slot of time and receives from the individual mobile unit during a particular slot of time. One standard for TDMA systems is the Digital European Cordless Telecommunications DECT Common interface standard described in ETS 300 175-2 and ETS 300 175-3, published by the European Telecommunication Standards Institute. The DECT standard is also discussed in U.S. Pat. No. 6,078,574 entitled "PROCESS AND APPARATUS FOR ACTION CONTROL IN A TIME SLOT METHOD", to Boetzel et al. issued Jun. 20, 2000 and U.S. Pat. No. 6,088,338 entitled "METHOD AND SYSTEM FOR THE DETERMINATION OF THE PSCN PARAMETER STARTING FROM THE MFN PARAMETER IN A DECT CORDLESS TELEPHONE SYSTEM" to Rossella et al. issued Jul. 11, 2000, which are incorporated by reference. Generally, the DECT standard does not provide a specification to send a voice message to all mobile units simultaneously as a broadcast.

Due to this limitation, it is not possible to broadcast a streaming audio signal, such as RealAudio™, over a conventional cordless phone system thereby providing the capability of listening to broadcast news, for example, while still maintaining the ability to use the cordless phone to send and receive phone calls.

Therefore, in a cordless phone system having a base station and a mobile unit, it is desirable to provide a broadcast over broadcast mode that enables a user to both listen to a streaming audio signal yet still maintain the ability to both send and receive conventional telephone calls.

SUMMARY OF THE INVENTION

To achieve the foregoing and other objects and in accordance with the purpose of the present invention a call screen over broadcast mode in a cordless telephone system is provided. Generally, a cordless telephone base unit in a broadcast mode receives a radio or streaming audio signal. A call controller unit included in or coupled to the base station then sends the received radio or streaming audio signal to at least one mobile unit in communication with the base station. In those cases where a mobile unit is receiving the broadcast and a conventional phone call is received at the base station, then a determination is made whether or not to send the conventional call to the mobile unit is made. In those cases where the conventional call is to be forwarded, then the base station is set to standard mode and the conventional call is forwarded to the mobile unit whereas any other mobile unit in communication with the base station still receive the broadcast.

When the conventional phone call has been completed, the base station is set to broadcast mode where the mobile unit commences to again receive the broadcast.

In another embodiment, a cordless telephone system is disclosed. The cordless telephone system includes a base station operable in a broadcast mode and a standard mode and a mobile unit in communication with the base station. In a preferred embodiment, when the base station is broadcasting a signal to the mobile unit in the broadcast mode and when it is determined that an incoming message is to be forwarded to the mobile unit, the base station is set to the standard mode until incoming message is terminated.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
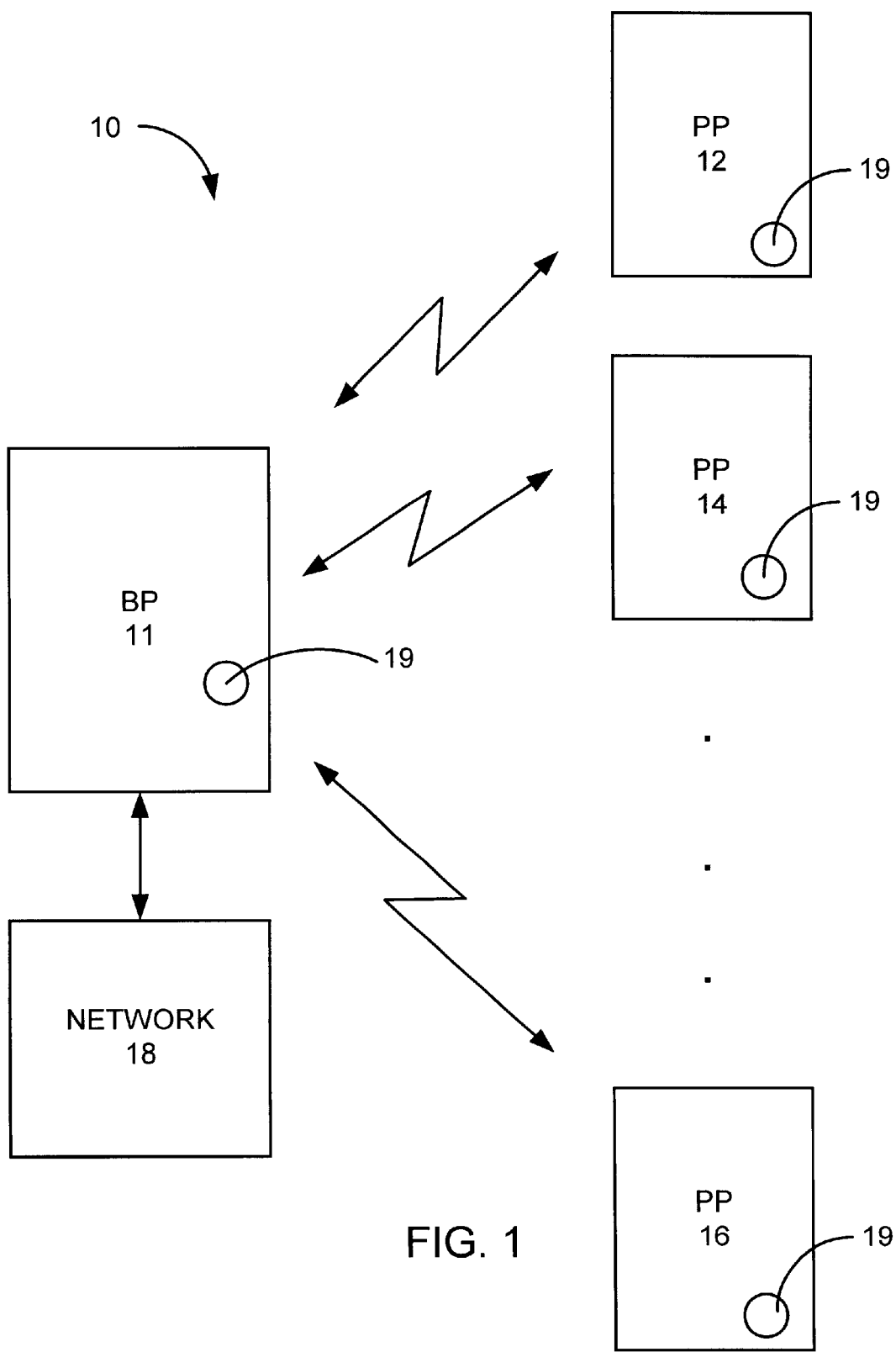
FIG. 1 is a schematic view of a cordless system that uses the invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In one embodiment of the invention, a base unit in a broadcast mode receives a radio signal or, when coupled to a distributed network of computers, a streaming audio signal. In some cases, the streaming audio signal originates from a streaming audio which is delivered to the base station by way of a modem, or other such device, coupled to the distributed network of computers, such as the Internet. In the broadcast mode, the base station sets one system channel to transmit the radio or streaming audio signal to any number of mobile units that are in communication with the base station. In some implementations, a single radio or streaming audio signal is broadcast by the base station, whereas in other cases, a user can configure his/her particular mobile unit to receive a particular radio or streaming audio signal associated with, for example, a desired radio station, newscast, and the like.

Occasionally, a conventional phone call is received by the base station at the same time the user is listening to the radio or streaming audio signal over his/her mobile unit. In this situation, the base station queries the mobile unit's user whether or not the call is to be received. If the user desires to continue to listen to the broadcast, then the caller is sent a predefined message and the call is ended. Otherwise, the base station is set to a standard mode and the broadcast is halted until such time as the call has ended or the user signals the base station to resume the broadcast, in which case, the base station is reset to the broadcast mode.

In this way, the inventive cordless telephone system provides the capability of listening to a selected radio or streaming audio broadcast while still be capable of receiving a conventional phone call.

In another embodiment of the invention, a personal computer coupled to the base station provides an API for configuring the user interface of any of the plurality of mobile units. In this way, a user can customize the user interface to, for example, select particular radio stations when listening to a broadcast as well as configure his/her particular interface to include addition icons not otherwise available on a standard interface.

The invention will now be described in terms of a digital cordless phone system having a base station communicatively coupled to any number of associated mobile units. Each of the mobile units has associated with it a user.

To facilitate discussion, FIG. 1 is a schematic view of a cordless system 10, such as a cordless telephone system that utilizes the invention. The cordless system 10 comprises a base station 11 and a plurality of portable units 12, 14, 16. The base station 11 of the cordless system 10 is connected to a network 18. The plurality of portable units 12, 14, 16 communicate with the base station 11, which provides communications between the plurality of portable units 12, 14, 16 and the network 18. Although only three portable units 12, 14, 16 are illustrated other numbers of portable units are possible. For example there may be twelve portable units communicating to the base station 11. In this embodiment of the invention, time division multiple access (TDMA) is used to provide communication between each of the plurality of portable units 12, 14, 16 and the base station 11. The base station 11 and the plurality of portable units 12, 14, 16 each have a broadcast button 19.

Figure 2:
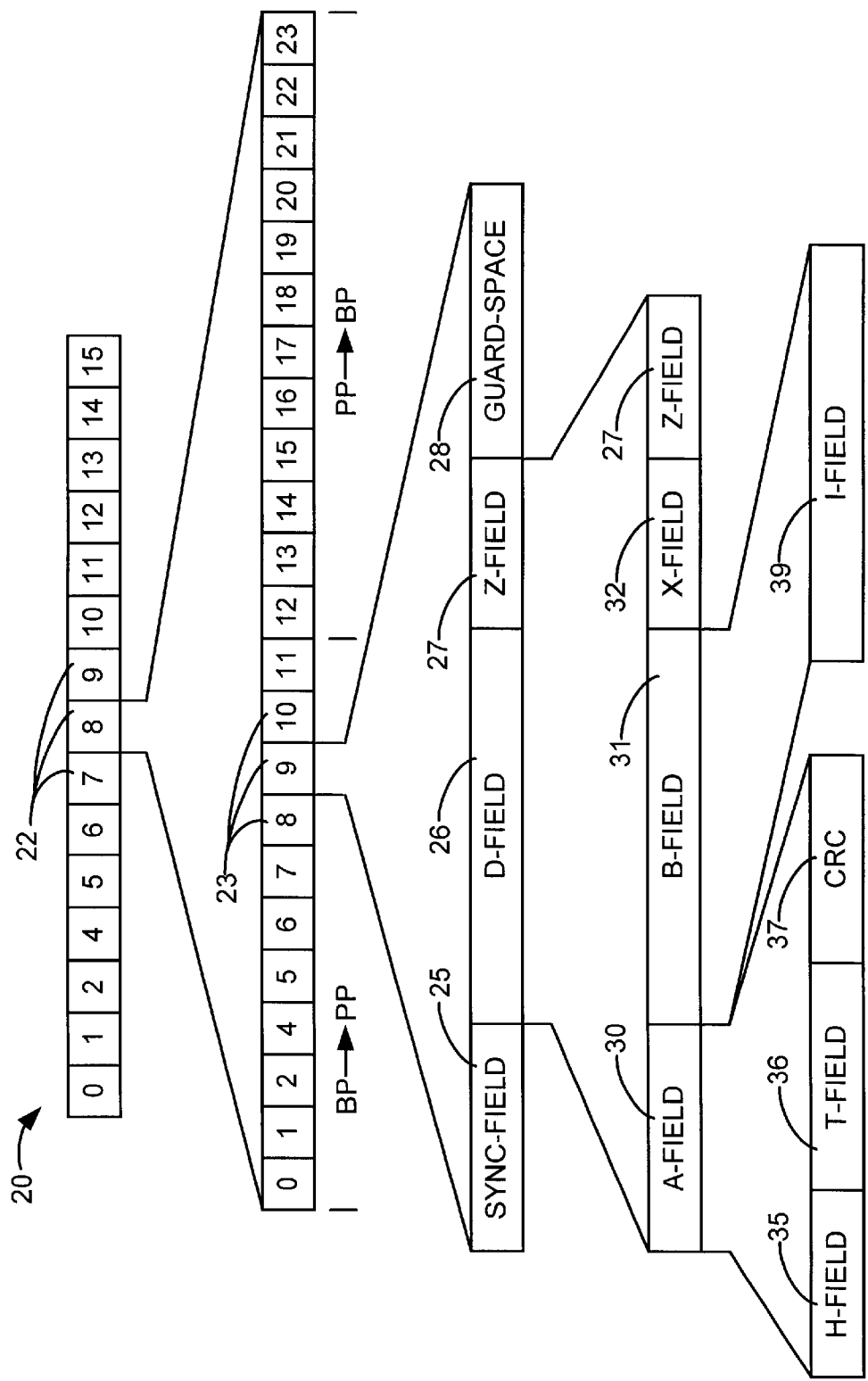
FIG. 2 shows a DECT frame structure.

FIG. 2 illustrates a DECT frame structure that uses TDMA and may be used in an embodiment of the invention. A multiframe 20 may contain sixteen frames 22. Each frame 22 of the multiframe 20 may be 10 ms (milliseconds). Each frame 22 of the multiframe 20 may be split into two sets of twelve fall slots 23 of equal size. The slots 23 may be time slots. The base station 11 may transmit to the plurality of portable units 12, 14, 16 for the first 5 ms., corresponding to slots 0 to 11 (illustrated as the BP→PP (base station to portable unit transmission)). For the second 5 ms., corresponding to slots 12 to 23 (illustrated as the PP→BP (base station to portable unit transmission)) the base station may receive from the plurality of portable units 12, 14, 16. A pair of time slots 23, such as slots 0 and 12, or 1 and 13 for transmitting and receiving may form a connection (channel). Each portable unit 12, 14, 16 may be assigned a slot 23 from the first 5 ms. and a slot 23 from the second 5 ms., so that each portable unit 12, 14, 16 may be assigned a channel. Since there are twelve channels, the base station 11 may accommodate twelve portable units.

Each time slot 23 may last for 416 $\mu$s, which may correspond to 480 bits. Each time slot may be split into a 32 bit synchronization field (sync-field) 25, a 388 bit D-field 26, a four bit Z-field 27, and a 56 bit guard space 28. The D-field 26 may comprise a 64 bit A-field 30, a 320 B-field 31, and a four bit X-field 32. The A field 30 may comprise an eight bit header (H-field) 35, a forty bit tail (T-field) 36, and a 16 bit redundancy (CRC) 37. The B-field 31 may comprise a 320 bit information field (I-field) 39. The I-field 39 may be used to carry data, such as part of a digitized audio message. The header 35 may describe the information in the tail 36. Various commands and command information, such as identification commands, frequency information, slot/frame information, and slot commands may be placed in the tail 36. The base station 11 and portable units 12, 14, 16 receive messages and process the commands in the tail 36.

Figure 3:
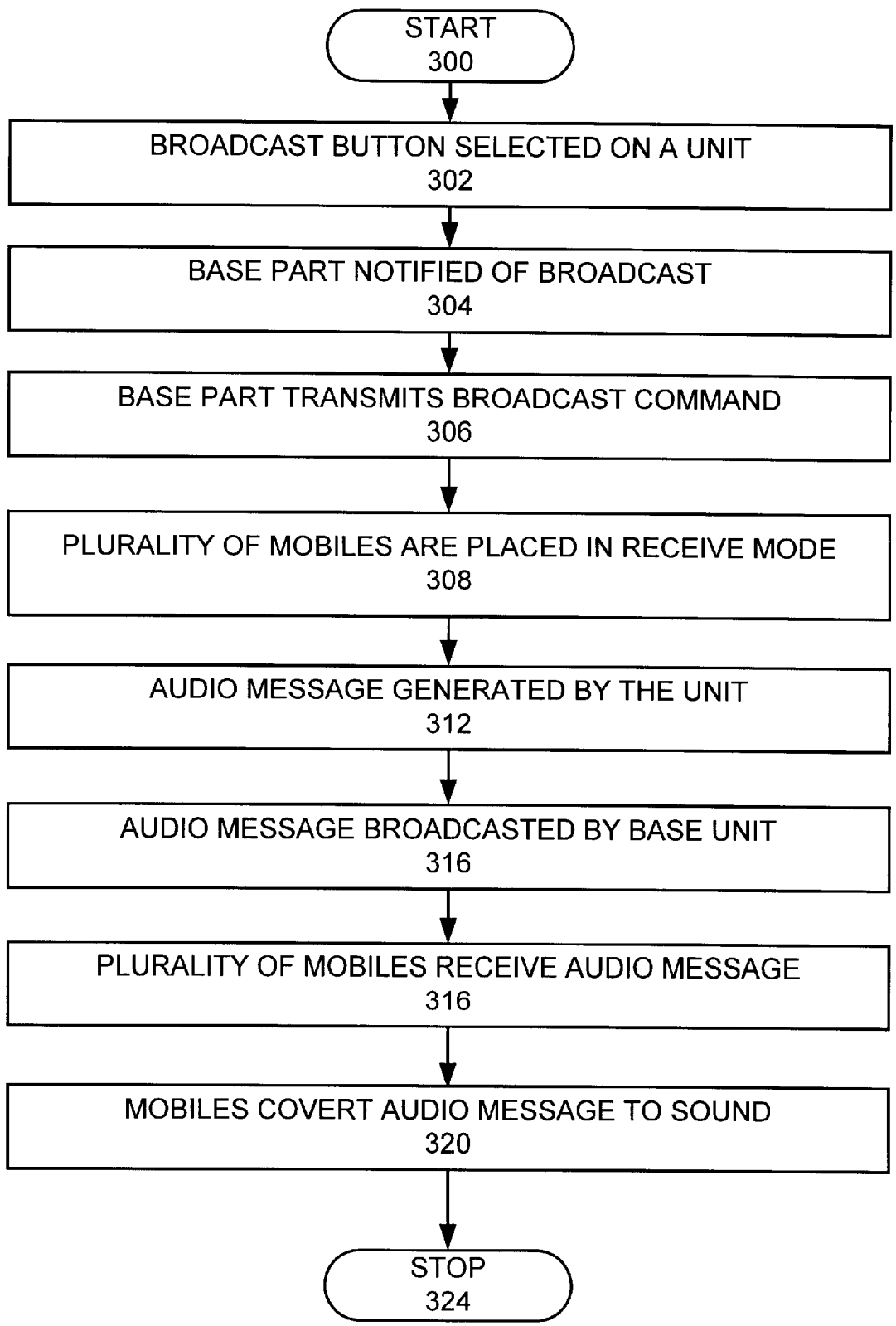
FIG. 3 is a high level flow chart of a method used in the accordance with an embodiment of the invention.

FIG. 3 is a high level flow chart of a method used in the preferred embodiment of the invention. A broadcast button 19 (FIG. 1) is selected on a unit (step 302). The base station 11 and the portable units 12, 14, 16 may have broadcast buttons 19, that allow either the base station 11 or one of the portable units 12, 14, 16 to broadcast. The broadcast button 19 may be a button dedicated only to broadcasting or one or more general purpose buttons, which may be pushed in a special sequence for broadcasting. The base station 11 is notified of the selection of the broadcast button 19 (step 304). If the broadcast button 19 on the base station 11 is selected, then the selection of the broadcast button 19 is noted by the base station 11. If the broadcast button 19 on one of the portable units 12, 14, 16 is selected, a broadcast command may be placed in the T-field 36 of a message sent to the base station 11. The base station is then notified of the selection of the broadcast button 19. In this example, the broadcast button 19 for the first portable unit 12 is selected, where the first portable unit uses slots 1 and 13. The base station 11 receives a message during slot 13 with a broadcast command in the T-field 36, which the base station 11 recognizes as a broadcast request from the first portable unit 12.

The base station 11 then transmits a broadcast command (step 306). In this example, the base station transmits broadcast command messages during slots 0 and 2–11 with a broadcast command in the T-field with a slot designation, for example slot 4. The remaining plurality of portable units 14, 16 receive the broadcast command messages. The broadcast command in the T-field causes the remaining plurality of portable units 14, 16 to go a receive only mode and become synchronized to receive signals from the designated slot, in this example slot 4 (step 308). The first portable unit 12 may transmit a plurality of messages with digitized audio information in the I-field 39 (step 312). The base station 11 receives the messages from the first portable unit 12 at slot 13 and sends broadcast messages with the same digitized audio text during slot 4, thus rebroadcasting the audio message (step 316). Since the remaining plurality of portable units 14, 16 are in a receiving mode and synchronized with slot 4, all of the remaining plurality of portable units 14, 16 receive the audio message (step 316) and access the digital data in the I-field 39 to convert the audio message to sound (step 320). The first portable unit 12 or the base station 11 may terminate the broadcast mode by having the base station 11 transmit a message that commands the remaining plurality of portable units 14, 16 to synchronize with different slots.

If the broadcast button 19 on the base station 11 is selected, then the broadcast audio message is generated at the base station 11. In such a case, the broadcast message is not received by the base station 11 through one of the slots.

In one embodiment of the invention, if a portable unit of the remaining plurality of portable units is busy (i.e. is being used for a telephone conversation) that portable unit will ignore the broadcast message.

The network 18 may be a regular telephone system. In the alternative, the network 18 may form a network of base stations. Such a network may form a large network of base stations communicating with portable units. In such a situation, it may be desirable to provide an audio broadcast to portable units associated with all of the base stations. In such a case, the base station 11 may also send the audio message to the network 18 of base stations, which broadcast the audio message to the portable units using the above mentioned method.

Figure 4:
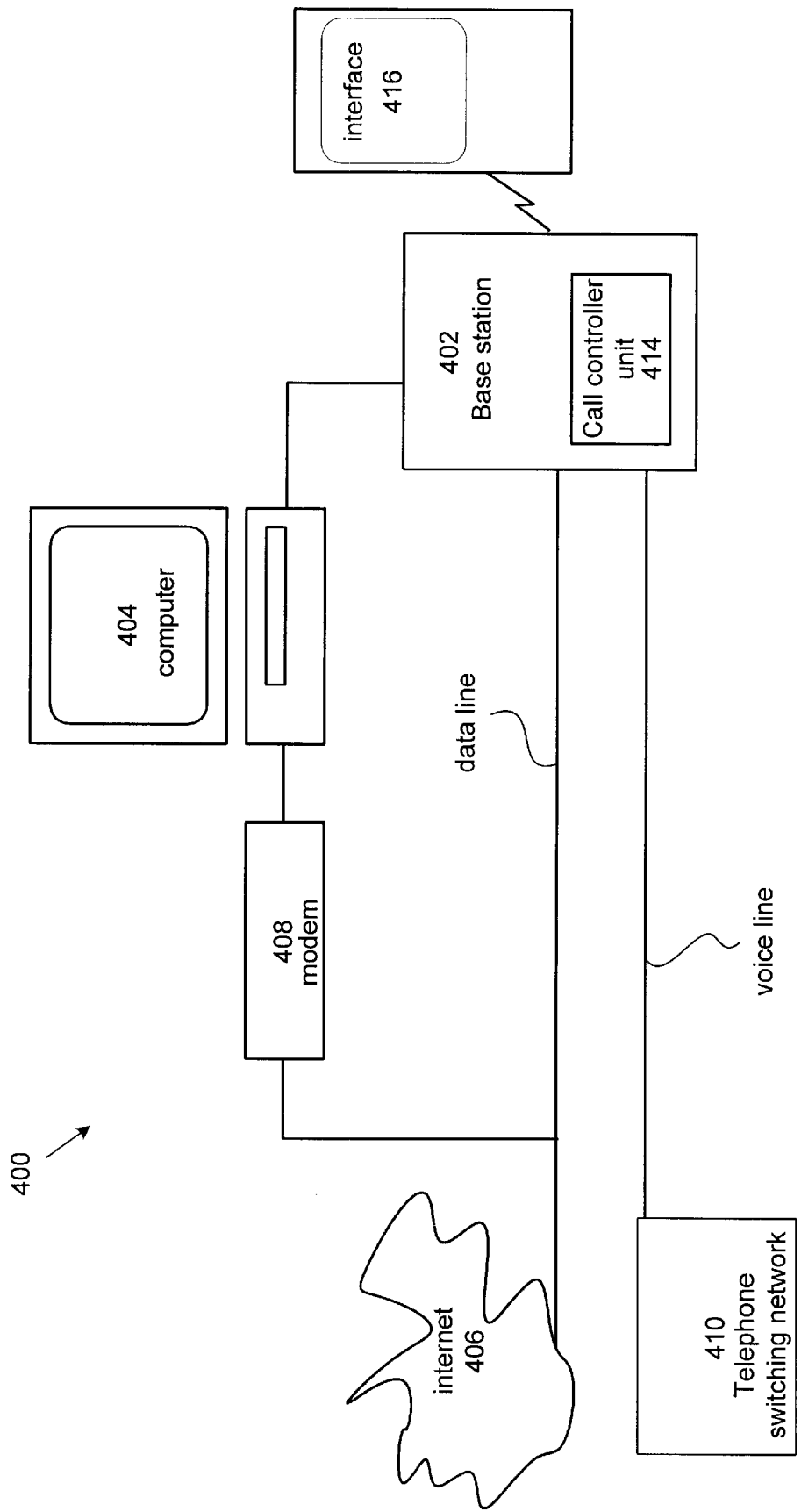
FIG. 4 is a schematic view of the cordless system wherein a base station is capable of broadcasting a streaming audio signal in accordance with an embodiment of the invention.

FIG. 4 is a schematic view of a cordless system 400 capable of broadcasting a radio or streaming audio signal in accordance with an embodiment of the invention. It should be noted that the system 400 is one embodiment of the system 10 shown in FIG. 1 and should not be consider to limit either the scope or intent of the invention. The system 400 includes a base station 402 coupled to a computer 404 which, in turn, is coupled to a streaming audio server (not shown) as part of the Internet 406 by way of a modem 408. In some cases, the base station 402 can be directly coupled to the Internet 406 in parallel with the computer 404 (such as for example, as would be the case in an intranet type of arrangement). In addition to being coupled to the Internet 406, the base station 402 is connected to a conventional telephone switching network 410 so as to be able to receive a conventional phone call.

When the base station 402 is set to a broadcast mode, a system channel, such as 23, is set to transmit only. In this way, a mobile unit 412 is able to receive the broadcast in real time. For example, if the computer 404 is receiving a streaming audio signal from the streaming audio server by way of the modem 408, the streaming audio signal is sent to a call controller unit 414 included in the base station 402. The call controller unit 414 sets at least one system channel to broadcast whereas the remaining channels are set to receive a standard telephone call. In this way, the mobile unit 412 can receive the streaming audio broadcast and in those cases when a conventional call is received, the call controller unit 414 (when instructed to do so) can switch the received call to one of the remaining channels assigned to transfer conventional calls. In so doing, the mobile unit can be configured to switch from receiving the radio (or streaming audio broadcast) to receiving the conventional phone call. Once the call has been completed, if so instructed, the call controller unit switches back to the system channel dedicated to broadcasting the radio or streaming audio signal.

In some cases, a user can select a desired station to listen to or can configure the mobile unit 412 to select any number of possible stations. For example, using an API resident on the computer 404, a user can configure an interface 416 on the mobile unit 412 to include various icons associated with particular stations or station formats. In this way, the user can quickly scan across selected stations or station formats by accessing particular icons on the interface 416. In addition, when the base station switches to a convention call mode, the interface 416 can be also switched to a configuration consistent with receiving a conventional phone call. By providing such an API, the mobile unit 412 is able to easily and efficiently provide a tool for navigating both the broadcast mode as well as the conventional phone call mode.

Figure 5:
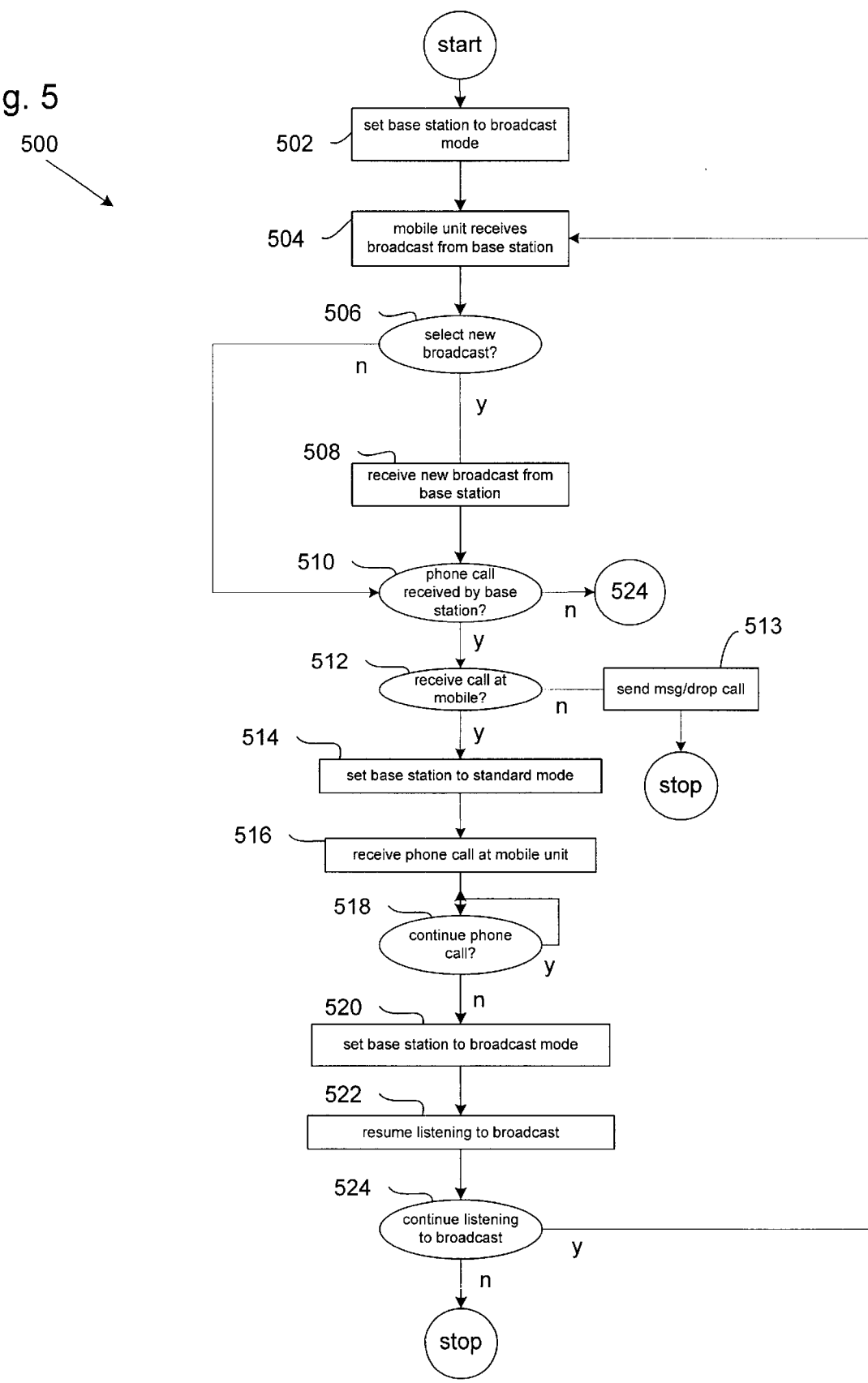
FIG. 5 shows a flowchart detailing a process for providing a selectable broadcast over broadcast mode in a digital cordless telephone system in accordance with an embodiment of the invention.

FIG. 5 shows a flowchart detailing a process 500 for providing a selectable broadcast over broadcast mode in a digital cordless telephone system in accordance with an embodiment of the invention. The process 500 begins at 502 by setting a base station of a broadcast mode. In the described embodiment, the base station is set to broadcast by, for example, dedicating a channel (or channels) to broadcast only whereas the remaining channels remain free to receive a conventional telephone call. Once set to broadcast mode, a mobile unit in communication with the base station receives the broadcast at 504. At 506, a determination is made whether or not to select a new broadcast. In one embodiment, the mobile unit includes a configurable interface that by use of an API that is resident on a computer coupled to the base station can be configured to select any number and types of stations. If a new broadcast is selected, then at 508, the mobile unit receives the new broadcast. Whether or not a new broadcast was selected, if during a broadcast, a determination is made at 510 that a conventional phone call has been received at the base station, then a determination is made at 512 whether or not the mobile unit is to receive the phone call. If the mobile unit is not to receive the phone call, then a predefined message is sent to the caller and the call is dropped at 513, otherwise control is passed to 514 where the base station is set to standard mode.

When the base station has been set to standard mode, then a call controller unit coupled to or included in the base station switches the active channel from the at least one reserved strictly for broadcast to one of the channels reserved for a conventional phone call. At 516, the phone call is received at the mobile unit and a 518, a determination is made whether to continue the phone call or not. When the phone call is to be terminated, then control is passed to 520 where the base station is set to the broadcast mode and at 522, the listening to the broadcast is resumed. At 524, a determination is made whether or not the mobile unit is to continue receiving the broadcast. When the receipt of the broadcast is to be continued, then control is passed back to 504, otherwise the process 500 stops.

Figure 6:
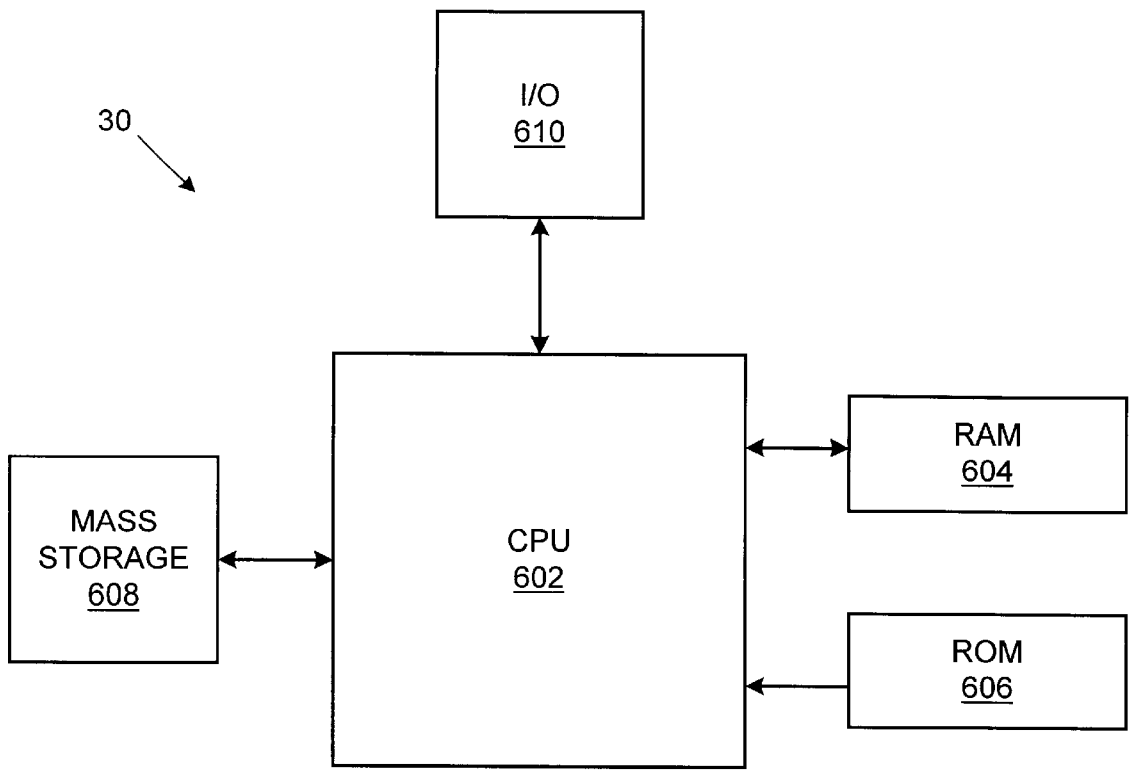
FIG. 6 depicts a computer suitable for use in FIG. 4.

A representative computer 600 suitable for use as computers 404 of FIG. 4 is illustrated schematically in FIG. 6. Computer 600 includes a central processing unit (CPU) 602 which is coupled bidirectionally with random access memory (RAM) 604 and unidirectionally with read only memory (ROM) 606. Typically, RAM 604 is used as a "scratch pad" memory and includes programming instructions and data, including distributed objects and their associated code and state, for processes currently operating on CPU 602. ROM 606 typically includes basic operating instructions, data and objects used by the computer to perform its functions. In addition, a mass storage device 608, such as a hard disk, CD ROM, magneto-optical (floptical) drive, tape drive or the like, is coupled bidirectionally with CPU 602. Mass storage device 608 generally includes additional programming instructions, data and objects that typically are not in active use by the CPU, although the address space may be accessed by the CPU, e.g., for virtual memory or the like. Each of the above described computers optionally includes an input/output source 610 that typically includes input media such as a keyboard, pointer devices (e.g., a mouse or stylus) and/or network connections. Additional mass storage devices (not shown) may also be connected to CPU 602 through a network connection. It will be appreciated by those skilled in the art that the above described hardware and software elements, as well as the networking devices, are of standard design and construction, and will be well familiar to those skilled in the art.

While this invention has been described in terms of several preferred embodiments, there are alterations, permutations, and substitute equivalents which fall within the scope of this invention. It should also be noted that there are many alternative ways of implementing the methods and apparatuses of the present invention. It is therefore intended that the following appended claims be interpreted as including all such alterations, permutations, and substitute equivalents as fall within the true spirit and scope of the present invention.

What is claimed is:

1. A broadcast over broadcast method suitable for a cordless telephone system having a base station operable in a broadcast mode and a standard mode communicatively coupled to mobile units, comprising:

setting the base station in the broadcast mode;

broadcasting a signal to the mobile units;

determining if an incoming message is to be forwarded to designated mobile units;

setting the base station to a standard mode when it is determined that the incoming message is to be forwarded to only the designated mobile units, receiving the incoming message only at the designated mobile units; and setting the base station to broadcast mode when the incoming message has been terminated such that the designated mobile units having received the incoming message commence to again receive the signal.

2. A method as recited in claim 1, wherein the cordless telephone system is a time division multiple access (TDMA) based system.

3. A method as recited in claim 2, further comprising:

broadcasting the incoming message from the base station during a single time slot of a time division;

receiving the incoming message at the plurality of mobile units; and converting the incoming message into sound by the plurality of mobile units.

4. A method as recited in claim 3, further comprising: placing the plurality of mobile units in a receiving mode.

5. A method as recited in claim 4, wherein the placing the plurality of mobile units in a receiving mode comprises synchronizing the plurality of mobile units to the single time slot.

6. A method as recited in claim 5, wherein setting the base station to the broadcast mode comprises designating the single time slot.

7. A method as recited in claim 6, wherein at least one of the plurality of mobile units is a hands free unit, wherein converting the audio message into sound by the hands free unit is automatic, and wherein the placing of the plurality of mobile units in a receiving mode places the plurality of mobile units in a receive only mode.

8. A method as recited in claim 7, further comprising:

originating a broadcast origination signal at an additional mobile unit;

transmitting the broadcast origination signal from the additional mobile unit to the base station; and transmitting the audio message from the additional mobile unit to the base station.

9. A method as recited in claim 8, wherein placing the plurality of mobile units in a receive only mode, comprises turning on only speakers of the plurality of mobile units without turning on microphones of the plurality of mobile units.

10. A method as recited in claim 1, wherein setting the base station to the standard mode comprises synchronizing those plurality of mobile units not desiring receive the broadcast to another time slot that is different than the single time slot.

11. A time division multiple access (TDMA) based broadcast over broadcast system, comprising:

a number of mobile units;

a base station in communication with the mobile units, the base station being operable in a standard mode and a broadcast mode, wherein the broadcast mode causes the mobile units to be placed in a receive only mode and to be synchronized to a particular time slot from where a broadcast message is sent;

a configurable call controller unit coupled to or included in the base station, wherein when the base station in the broadcast mode receives a broadcast type signal, the call controller unit sends the received signal to at least one of the mobile units, and wherein when a message is received at the base station for at least one of the mobile units as a designated mobile unit, the call controller unit determines whether or not to forward the received message to the designated mobile unit currently receiving the signal, and wherein when it is determined that the message is to be forwarded to the designated mobile unit, the call controller unit sets the base station to the standard mode such that the message is sent only to the designated unit while the remaining mobile units receive the broadcast signal.

12. A system as recited in claim 11, wherein the system is a cordless telephone system.

13. A system as recited in claim 11, wherein when the base station is in the standard mode, the call controller synchronizes those plurality of mobile units not desiring to receive the broadcast to another time slot that is different than the broadcast time slot.

14. A system as recited in claim 11, wherein the broadcast signal is a radio signal.

15. A system as recited in claim 11, wherein the broadcast signal is a streaming audio signal.

16. A system as recited in claim 11, further comprising wherein when at least one of the mobile units originates a call message signal corresponding to a call message, the originating mobile unit transmits the call message signal to the base station which, in turn, re-broadcasts the call message signal to those of the mobile units arranged to receive the call message signal.

17. A system as recited in claim 16, wherein the broadcast mode is terminated by a termination command that causes those mobile units synchronized to the broadcast time slot to synchronize with a different time slot.

\* \* \* \* \*